US008464540B2

(12) United States Patent
Shirvanian et al.

(10) Patent No.: US 8,464,540 B2
(45) Date of Patent: Jun. 18, 2013

(54) WASTE TO ENERGY PROCESS AND PLANT

(75) Inventors: Kosti Shirvanian, Newport Beach, CA (US); Arthur Aykanian, Laguna Hills, CA (US)

(73) Assignee: Pacific Waste, Inc., Newport Beach, CA (US)

( * ) Notice: Subject to any disclaimer, the term of this patent is extended or adjusted under 35 U.S.C. 154(b) by 898 days.

(21) Appl. No.: 12/469,581

(22) Filed: May 20, 2009

(65) Prior Publication Data
US 2010/0043446 A1 Feb. 25, 2010

Related U.S. Application Data

(60) Provisional application No. 61/055,945, filed on May 23, 2008.

(51) Int. Cl.
F02B 43/08 (2006.01)
(52) U.S. Cl.
USPC .............. 60/781; 60/39.464; 60/772; 60/780; 60/784
(58) Field of Classification Search
USPC ................. 60/39.464, 772, 780, 781, 784
See application file for complete search history.

(56) References Cited

U.S. PATENT DOCUMENTS

| 3,759,036 | A | * | 9/1973 | White ............................. 60/775 |
| 4,419,530 | A | * | 12/1983 | Nath ............................. 136/251 |
| 4,503,681 | A | * | 3/1985 | Willyoung et al. ............. 60/655 |
| 5,659,977 | A | * | 8/1997 | Jensen et al. .................... 34/547 |
| 5,922,090 | A | * | 7/1999 | Fujimura et al. ............ 48/197 R |
| 5,958,761 | A | * | 9/1999 | Yogev et al. ............... 435/292.1 |
| 7,438,744 | B2 | * | 10/2008 | Beaumont ......................... 95/92 |

* cited by examiner

*Primary Examiner* — Phutthiwat Wongwian
*Assistant Examiner* — Steven Sutherland
(74) *Attorney, Agent, or Firm* — John J. Connors; Connors & Assoc. PC

(57) ABSTRACT

A plant produces electrical energy from municipal solid waste without exhausting a carbon dioxide or other carbon based gas to the atmosphere. The plant includes a source of artificial light powered by electrical energy, and a reactor into which the municipal solid waste is fed and which is operated under temperature, pressure and flow rate conditions to produced a syngas. An electrical energy generating station at which the syngas is burned produces the electrical energy and a flue gas comprising carbon dioxide and other products of combustion. At least a portion of the electrical energy is used to power the artificial light source. A carbon dioxide collector separates the carbon dioxide from the other products of combustion in the flue gas to provide a clean carbon dioxide suitable as a nutrient for microorganisms, and a farm of the microorganisms is illuminated essentially constantly, alternately with sunlight and artificial light from said source.

8 Claims, 4 Drawing Sheets

STEP I

PROCESS A

PROCESS B

PROCESS C

STEP II

STEP III

STEP IV

STEP III & IV

WASTE TO ENERGY PROCESS AND PLANT

RELATED APPLICATION

This application claims the benefit under 35 USC 119(e) of U.S. Provisional Patent Application No. 61/055,945, entitled "WASTE TO ENERGY PROCESS AND PLANT," filed May 23, 2008. This related application is incorporated herein by reference and made a part of this application. If any conflict arises between the disclosure of the invention in this utility application and that in the related provisional application, the disclosure in this utility application shall govern. Moreover, any and all U.S. patents, U.S. patent applications, and other documents, hard copy or electronic, cited or referred to in this application are incorporated herein by reference and made a part of this application.

INCORPORATION BY REFERENCE

Any and all U.S. patents, U.S. patent applications, and other documents, hard copy or electronic, cited or referred to in this application are incorporated herein by reference and made a part of this application.

DEFINITIONS

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

The words "municipal solid waste" include any solid organic material normally produced by a population residing in a community of at least 10,000 individuals. It is not intended to be limited to any particular type of governing body of the community.

The word "Syngas" is the gas produced by the incomplete combustion of municipal solid waste and it includes carbon monoxide and hydrogen.

BACKGROUND

Disposing of waste such as garbage produced by small and large towns and cities is a challenge to do in an economical and environmentally friendly manner. Burning is unacceptable in some cases. Moreover, the carbon dioxide so produced is recognized as a major contributor to global warming. Landfills avoids this problem to some extent. The methane produced by the biomass in the landfill decomposing, however, is burned producing carbon dioxide. Sometimes the methane is used a source of fuel for an electrical generator.

SUMMARY

Our waste to energy process and plant have one or more of the features depicted in the embodiments discussed in the section entitled "DETAILED DESCRIPTION OF SOME ILLUSTRATIVE EMBODIMENTS." The claims that follow define our process and plant, distinguishing them from the prior art; however, without limiting the scope of our process and plant as expressed by these claims, in general terms, some, but not necessarily all, of their features are:

One, our process and plant produces electrical energy from municipal solid waste and may be essentially a continuous process and the plant operated essentially continuously. In our process and plant, municipal solid waste is fed to a reactor, for example, a fluidized bed reactor, operated under temperature, pressure and flow rate conditions to produced a syngas. The syngas is fed to an electrical energy generating station and burnt to produce electrical energy and a flue gas comprising carbon dioxide and other products of combustion. Heat from the flue gas may be used to produce steam that drives an electrical generator. This heat is extracted from the flue gas prior to forwarding the flue gas to a carbon dioxide collector.

Two, the flue gas is fed to the carbon dioxide collector to separate the carbon dioxide from the other products of combustion. The carbon dioxide collector may include a porous particulate material having a surface with a high area. The carbon dioxide collects on the surface at a temperature below a predetermined level and at a temperature above the predetermined level releases carbon dioxide collected on the surface.

Three, the carbon dioxide from the collector is fed to a farm of microorganisms. The carbon dioxide is sufficiently free of contaminants so the carbon dioxide is a suitable nutrient for the microorganisms. The microorganisms may be illuminated essentially continuously 24 hours a day and a fiber optical system may be used to transmit light from a source to the microorganisms. A light concentrator may be used that concentrates the light and then forwards the concentrated the light via the optical fiber system to the microorganisms. The microorganisms produce a high-purity oxygen that is recycled to be mixed with the syngas or fed to the fluidized bed reactor. The source of light may be the sun during daytime and artificial light during nighttime generate by a light station using the electrical energy from the electrical energy generating station.

Four, the plant may include a roof having one or more solar panels thereon that generate electrical energy.

These features are not listed in any rank order nor is this list intended to be exhaustive.

DESCRIPTION OF THE DRAWING

Some embodiments of our waste to energy process are discussed in detail in connection with the accompanying drawing, which is for illustrative purposes only. This drawing includes the following figures (Figs.), with like numerals indicating like parts.

DETAILED DESCRIPTION OF SOME ILLUSTRATIVE EMBODIMENTS

Figure 1:
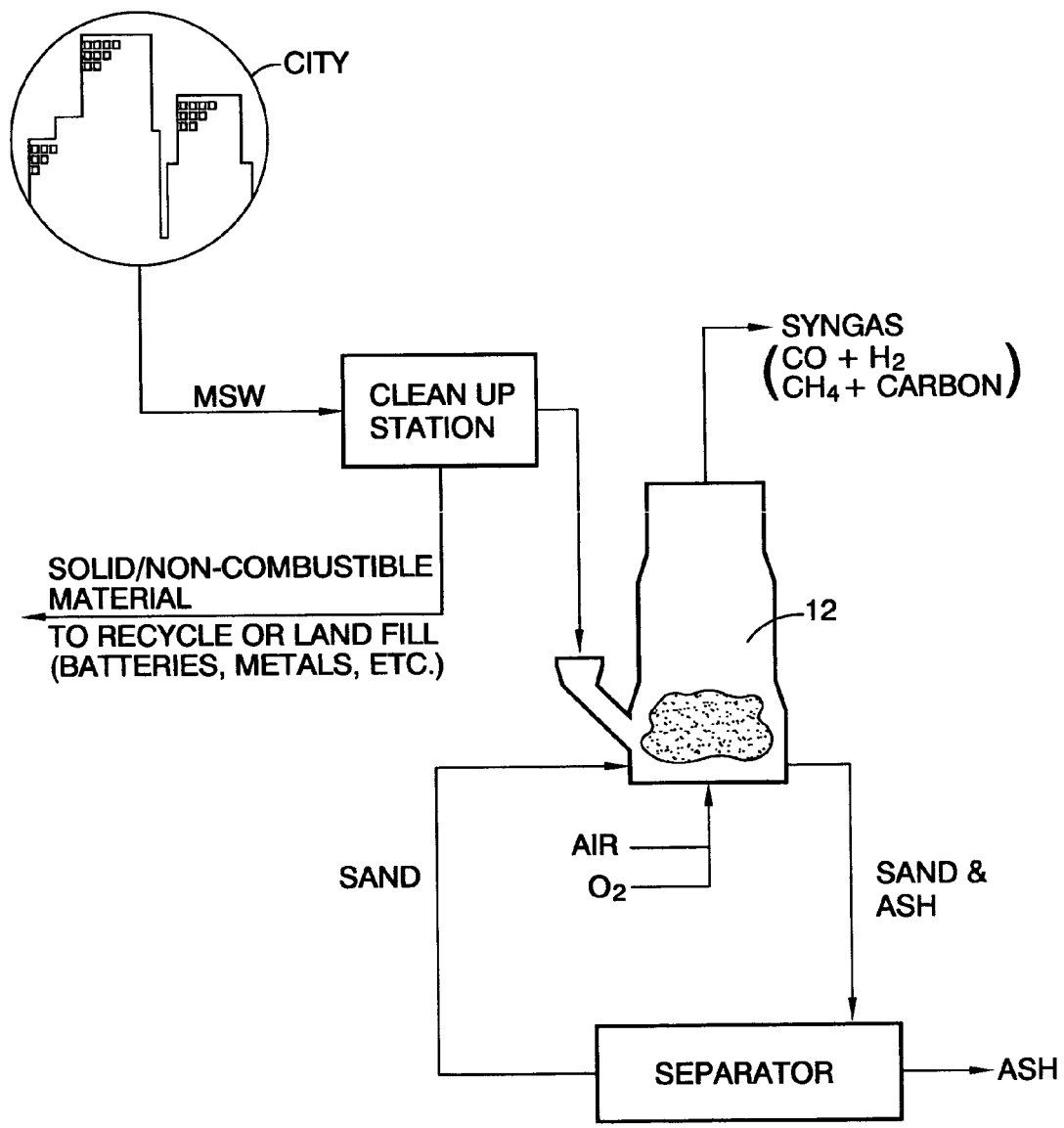
FIG. 1 is a schematic diagram of our waste to energy process.
Figure 1:
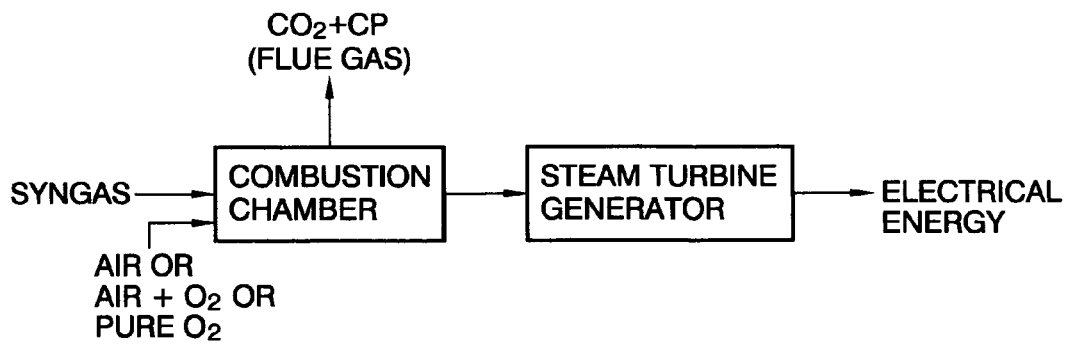
Figure 1:
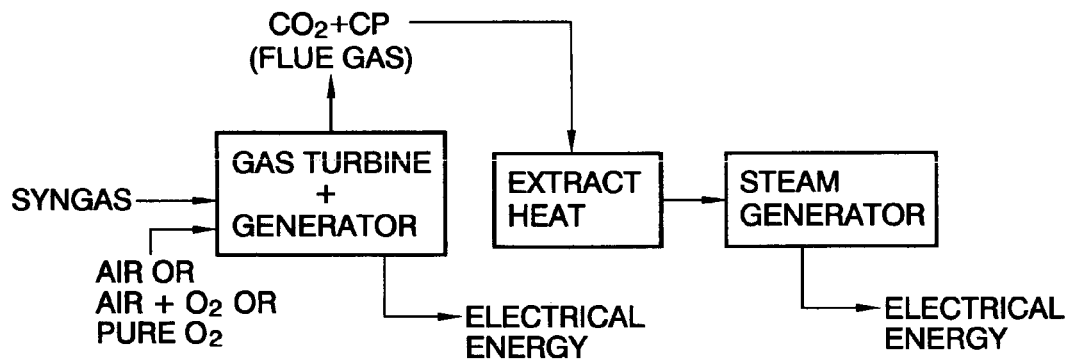
Figure 1:
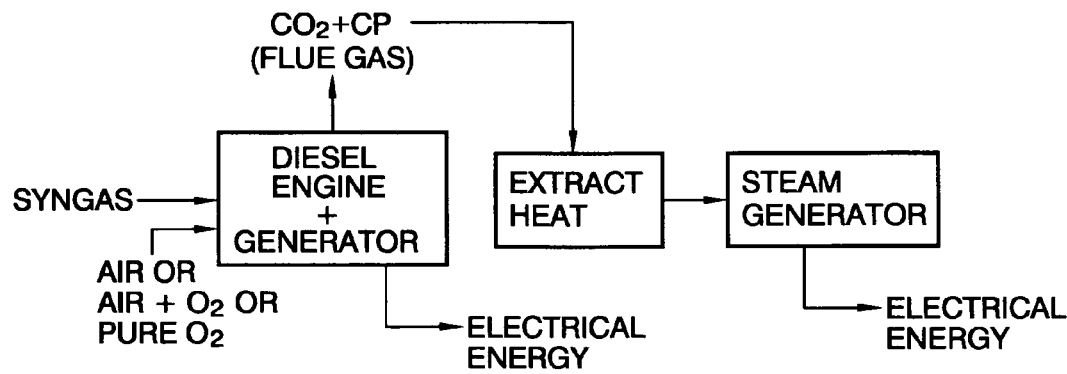
Figure 1:
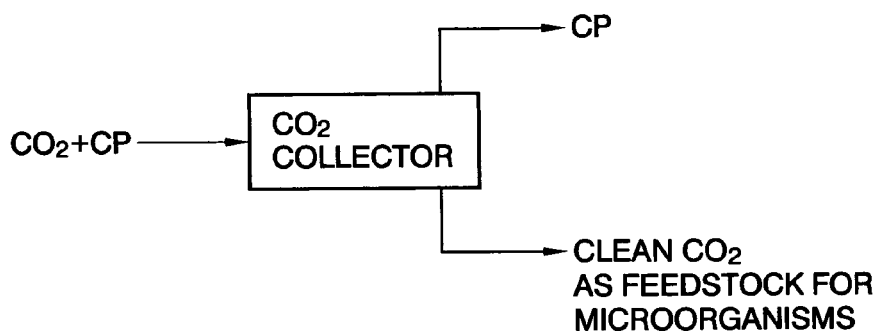
Figure 1:
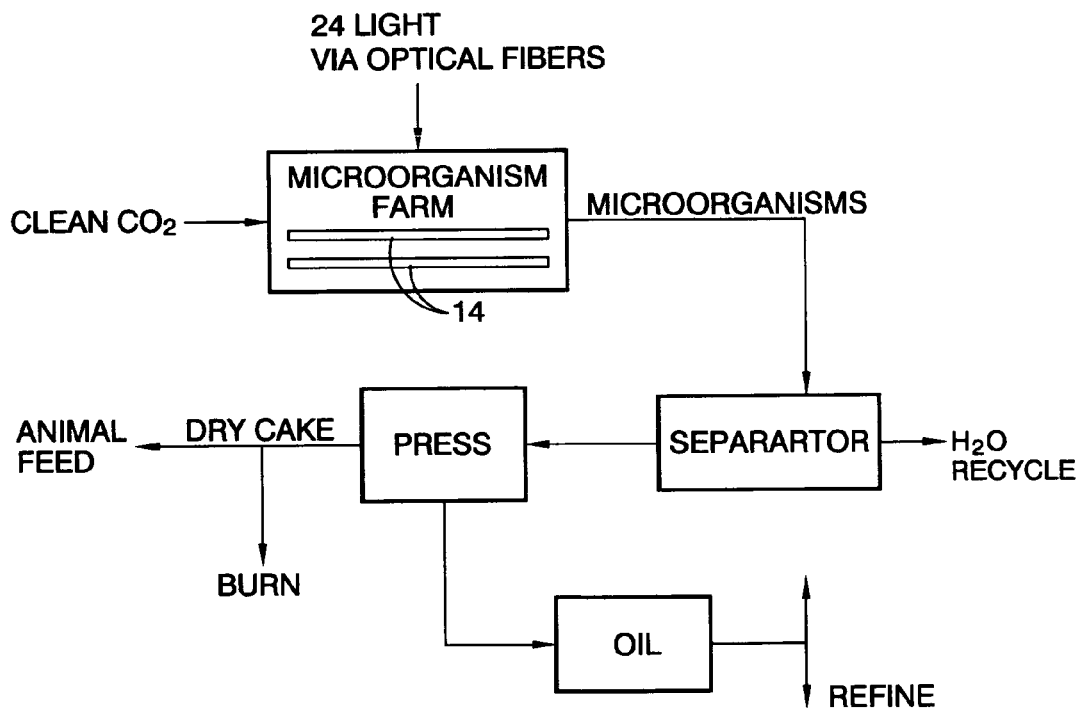
Figure 2:
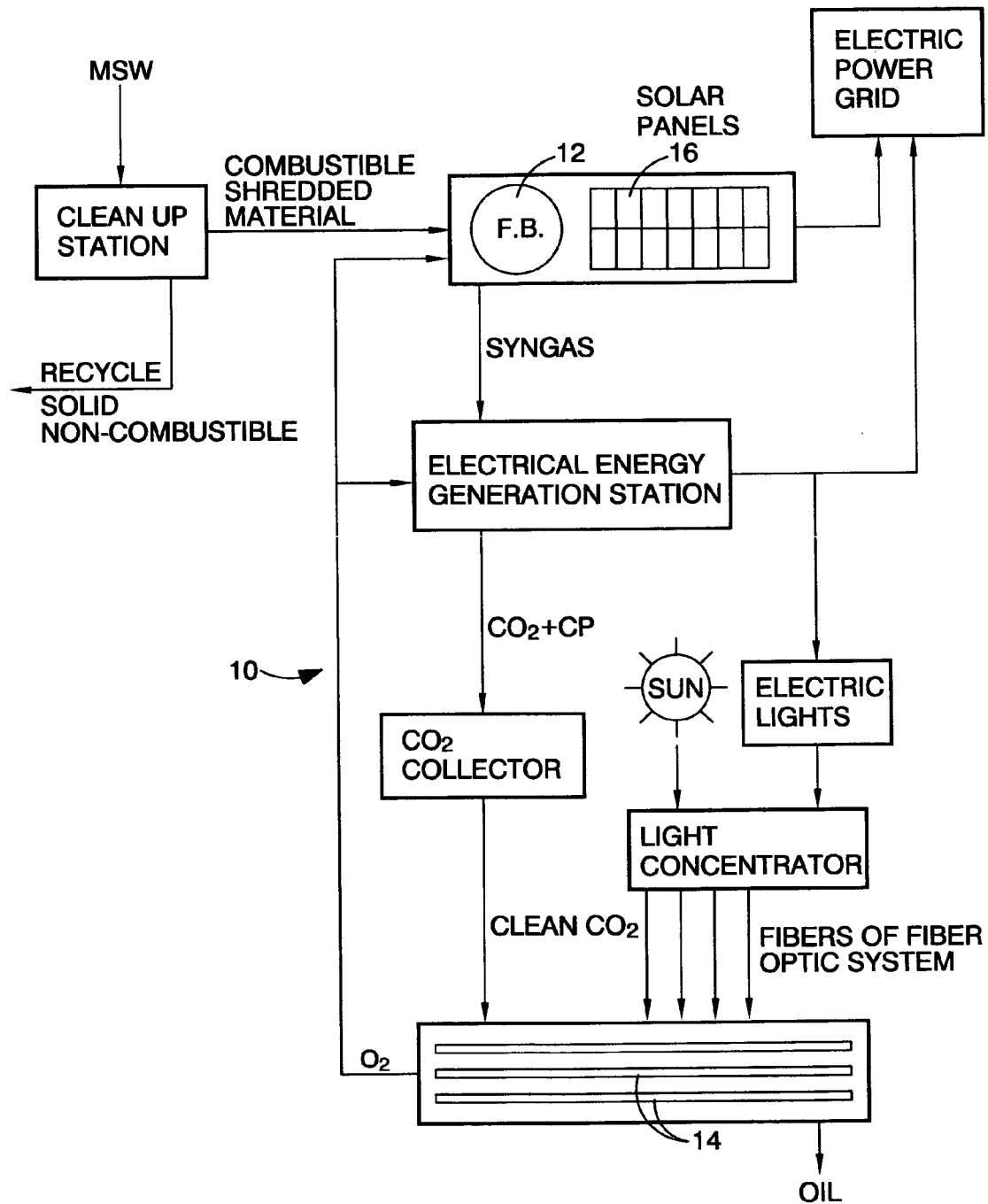
FIG. 2 is a schematic diagram of our plant in which our waste to energy process is conducted.

One embodiment of our plant for producing electrical energy from municipal solid waste is generally designate by the numeral 10 as depicted in FIG. 2. This plant 10 utilizes our process, which is essentially continuous and comprises the Steps I through IV, as illustrated in FIG. 1.

Step I

A city, preferably one with a large population of over 10,000 individuals, generates enough municipal solid waste MSW to make it economical to use it as a feedstock for our plant 10. The municipal solid waste MSW is first processed at a clean up station where solid, incombustible material such as, for example, batteries, metals, etc. is removed, typically manually but magnets and other devices may assist in this clean up. This solid, incombustible material is recycled if it so lends itself or sent to a land fill. The combustible material may be shredded and is then fed to a fluidized bed reactor 12 under temperature, pressure and flow rate conditions to produced a syngas (a mixture of carbon monoxide, hydrogen, methane, and carbon particulates). The fluidized bed reactor 12 may use sand particles as a carrier medium. This STEP I also produces an ash which is separated from the sand and the sand is recycled to the fluidized bed reactor 12.

Step II

The syngas is burnt at an electrical energy generating station to produce electrical energy and a flue gas comprising carbon dioxide and other combustion products CP. As illustrated in STEP III, the flue gas is fed to a carbon dioxide collector station to separate the carbon dioxide from the other combustion products CP. The carbon dioxide collector station may comprise a bed porous particulate material having a surface with a high area. The carbon dioxide collects on this surface at a temperature below a predetermined level but the other combustion products CP pass through the bed porous particulate material. Initially, the bed is operated at the lower temperature so the carbon dioxide collects on the surface of the porous particulate material. At a temperature above the predetermined level the bed porous particulate material releases the carbon dioxide collected on the surface. Thus, from time to time, the temperature of the bed is elevated to this higher temperature. In an alternate embodiment, as discussed subsequently, the flue gas is fed directly to microorganisms.

Step III

The syngas provides the fuel for an electrical energy generation station. The syngas may be burnt in a combustion chamber to provide heat to boil water and generate steam that drives an electrical generator as depicted in sub-step A. The syngas may be burnt directly in a gas turbine to drive an electrical generator without producing steam as depicted in sub-step B. Or, the syngas may be burnt directly in a diesel engine to drive an electrical generator without producing steam as depicted in sub-step C. As shown, in sub-steps B and C heat may be extracted from the flue gas prior to forwarding the flue gas from the electrical energy generation station to the carbon dioxide collector.

Step IV

The carbon dioxide from the carbon dioxide collector station is fed to a farm of microorganisms. The carbon dioxide is sufficiently free of contaminants so it is a suitable nutrient for the microorganisms. The microorganisms are within tubes 14 that allow light to pass though walls of the tubes. In some cases, depending on the characteristics of the microorganisms, the flue gas from the electrical energy generation station may be fed directly into the farm of microorganisms without the clean up step. A fiber optical system transmits light from a source to the microorganisms via a light concentrator having its output connected to the fiber optical system. The source of light is the sun during daytime and artificial light at nighttime generate by lights using the electrical energy produced by the electrical energy generating station. The microorganisms are thus illuminated essentially constantly 24 hours a day, alternately with sunlight and artificial light from the source. The microorganisms produce a high-purity oxygen that is recycled to be mixed with the syngas or fed to the fluidized bed reactor 12. Diluting air used in burning with the high-purity oxygen reduces the amount of nitrogen gases that are undesirable. They also produce an oil that may be refined, or recycled and burnt. The microorganisms from the farm are collected and water removed. The collected microorganisms after separating water are pressed into cakes and used as animal fed or recycled and burnt in the fluidized bed reactor 12. As an optional feature, a roof of the plant 10 may have thereon one or more solar panels 16 that generate electrical energy that is used in our process or sent to an electrical power grid.

Incomplete combustion of municipal solid waste to make syngas to power directly a gas turbine or diesel engine is an efficient way to generate electrical energy, and using carbon dioxide as a nutrient for a microorganism farm rather than exhausting it to the atmosphere avoids pollution. Moreover, the microorganism farm produces a high-purity oxygen that when recycled reduces the amount of nitrogen oxide gases produce when burning only with air that contains nitrogen. The oil produced by the may be recycled as a fuel in our plant 10 or refined.

Scope of the Invention

The above presents a description of the best mode we contemplate of carrying out my our waste to energy process and plant and of the manner and process of making and using them, in such full, clear, concise, and exact terms as to enable any person skilled in the art to which they pertain to make and use our waste to energy process and plant. Our waste to energy process and plant are, however, susceptible to modifications and alternate constructions from the illustrative embodiments discussed above which are fully equivalent. Consequently, it is not the intention to limit our waste to energy process and plant to the particular embodiments disclosed. On the contrary, our intention is to cover all modifications and alternate constructions coming within the spirit and scope of our waste to energy process and plant as generally expressed by the following claims, which particularly point out and distinctly claim the subject matter of our invention:

The invention claimed is:

1. A process that produces electrical energy from municipal solid waste, said process comprising the steps of
    (a) feeding the municipal solid waste to a reactor and operating the reactor under temperature, pressure and flow rate conditions to produced a syngas,
    (b) feeding the syngas to an electrical energy generating station and burning the syngas to produce electrical energy and a flue gas including carbon dioxide,
    (c) feeding the carbon dioxide to a farm of microorganisms where the microorganisms are illuminated by light, wherein said microorganisms produce a high-purity oxygen that is recycled to be mixed with the syngas or fed to the rector,
    (d) transmitting the light to the microorganisms through an optical fiber system from a light source, said light source comprising artificial light generated at least in part from the electrical energy from the electrical energy generating station.

2. The process of claim 1 where heat from the flue gas is used to produce steam that drives a steam generator.

3. A process that produces electrical energy from municipal solid waste, said process comprising the steps of
    (a) feeding the municipal solid waste to a reactor and operating the reactor under temperature, pressure and flow rate conditions to produced a syngas,
    (b) feeding the syngas to an electrical energy generating station and burning the syngas to produce electrical energy and a flue gas including carbon dioxide,
    (c) without exhausting the flue gas to the atmosphere, feeding the carbon dioxide to a farm of microorganisms where the microorganisms are illuminated by artificial light produced in part by the electrical energy produced by burning the flue gas, and wherein said microorganisms produce a high-purity oxygen that is recycled to be mixed with the syngas or fed to the reactor.

4. The process of claim 3 where said process is continuous and the microorganisms are illuminated essentially continuously 24 hours a day.

5. The process of claim 4 where the light is transmitted through an optical fiber system, said light being from the sun during daytime and the artificial light during nighttime.

6. The process of claim 3 where heat from the flue gas is used to produce steam that drives an electrical generator.

7. A plant that produces electrical energy from municipal solid waste,
said plant comprising
an artificial light source powered by electrical energy,
a fluidized bed reactor into which the municipal solid waste is fed and which is operated under temperature, pressure and flow rate conditions to produced a syngas,
an electrical energy generating station at which the syngas is burned to produce a flue gas including carbon dioxide and steam that drives an electrical generator that produces electrical energy, at least a part of the electrical energy being used to power said artificial light source,
a farm of microorganisms that is illuminated, alternating with sunlight and artificial light from said source, where said microorganisms produce a high-purity oxygen that is recycled to be mixed with the syngas or fed to the reactor, and
a light concentrator that concentrates the light and then forwards to the microorganisms the concentrated light via an optical fiber system.

8. The plant of claim 7 where the microorganisms are illuminated essentially constantly.

\* \* \* \* \*